United States Patent

[11] 3,632,881

[72] Inventor William I. Graham
Lane Cove, Australia
[21] Appl. No. 19,680
[22] Filed Mar. 16, 1970
[45] Patented Jan. 4, 1972
[73] Assignee International Business Machines Corporation
Armonk, N.Y.

[54] DATA COMMUNICATIONS METHOD AND SYSTEM
8 Claims, 7 Drawing Figs.

[52] U.S. Cl. 179/15 AL
[51] Int. Cl. H04j 3/04
[50] Field of Search 179/15 AL

[56] References Cited

UNITED STATES PATENTS 3,519,750 7/1970 Beresin 179/15 AL
3,529,089 9/1970 Davis 179/15 AL
3,544,976 12/1970 Collins 179/15 AL

*Primary Examiner*—Ralph D. Blakeslee
*Attorneys*—Hanifin and Jancin and John B. Frisone

ABSTRACT: A method of bidirectionally communicating data between a central control unit and a plurality of serially looped local control units in which a number of time-separated contiguous time slots are provided, the number of slots being substantially greater than one and substantially less than the maximum number of local controllers. The number of contiguous time slots are preceded by a header which includes synchronizing control and addressing data which permits local controllers to initiate transmission or reception of data which will continue via the specific slot assigned by the control data for the duration of the then initiated data exchange.

INVENTOR
WILLIAM I. GRAHAM

BY John B Frisone

ATTORNEY

DATA COMMUNICATIONS METHOD AND SYSTEM

BACKGROUND OF THE INVENTION

1. Field of the Invention

The invention relates to data communications and more particularly to a dynamic time division multiplex communications technique in which a plurality of time-separated data slots are dynamically allocated among a substantially larger number of data terminal controllers to effect bidirectional data communications between a central station and a plurality of remote terminals connected via their respective controllers to a serial transmission loop.

2. Description of the Prior Art

The communication of data over long distances is not only expensive but is limited by public carrier facilities available. In most instances voice grade lines provide the only economical solution. These lines are typically limited, for a number of reasons, to a data rate of 2,400 baud using conventional techniques.

The vast majority of data communications systems having a large number of terminals utilize multipoint, radial or a combination of both for distribution. A variety of line control techniques may be employed with the above distribution techniques. These techniques are suitable for use with voice grade lines, however, they fail to utilize the maximum capacity of the line due primarily to turn around time and overhead functions. More recently serial loop systems have been utilized with a substantial increase in potential line utilization.

A serial loop system interconnecting a large number of terminals by voice grade lines was described by J. M. Unk in an article, "Communications Networks for Digital Information," *IRE Transactions on Communications Systems*, Dec. 1960, pages 207–213. The described system achieves substantial utilization of the communications network, however, since it lacks a rigid line control it must utilize buffering at each of the remote terminal controllers. This imposes severe limitations on message length and format, and in addition increases cost, propagation delay, and time for overhead for message handling. Message length must be short since message buffering is required at each remote controller to prevent data loss or interruption of data in process of transmission. This constraint coupled with the requirement that each message unit must contain substantial overhead data reduces the efficiency of line utilization for transmitting meaningful data.

British Pat. No. 1,108,462 discloses another serial loop communications system in which a channel is provided for each terminal on the loop. With this arrangement, the channel capacity is not utilized during periods of no communications between the central and the terminal. Systems of this nature are wasteful of capacity in many applications, however, in certain environments, i.e., process control, etc., they can be effectively employed.

SUMMARY OF THE INVENTION

The invention contemplates a method and system for bidirectionally communicating data between a central control unit and a plurality of serially looped terminals in which a plurality of contiguous time-separated data slots substantially greater than one and less than the maximum number of terminals are provided, the plurality of contiguous time-separated data slots are preceded in time by a header which includes synchronizing data, control data and address data; said control data identifying at least one of said time slots and in addition indicating what function that time slot is dedicated to from among several functions which are to be performed by the system and said address data indicating the terminal assignment of the identified data slot for the time required to perform the function designated by the control data.

DESCRIPTION OF THE PREFERRED EMBODIMENT

Figure 1:
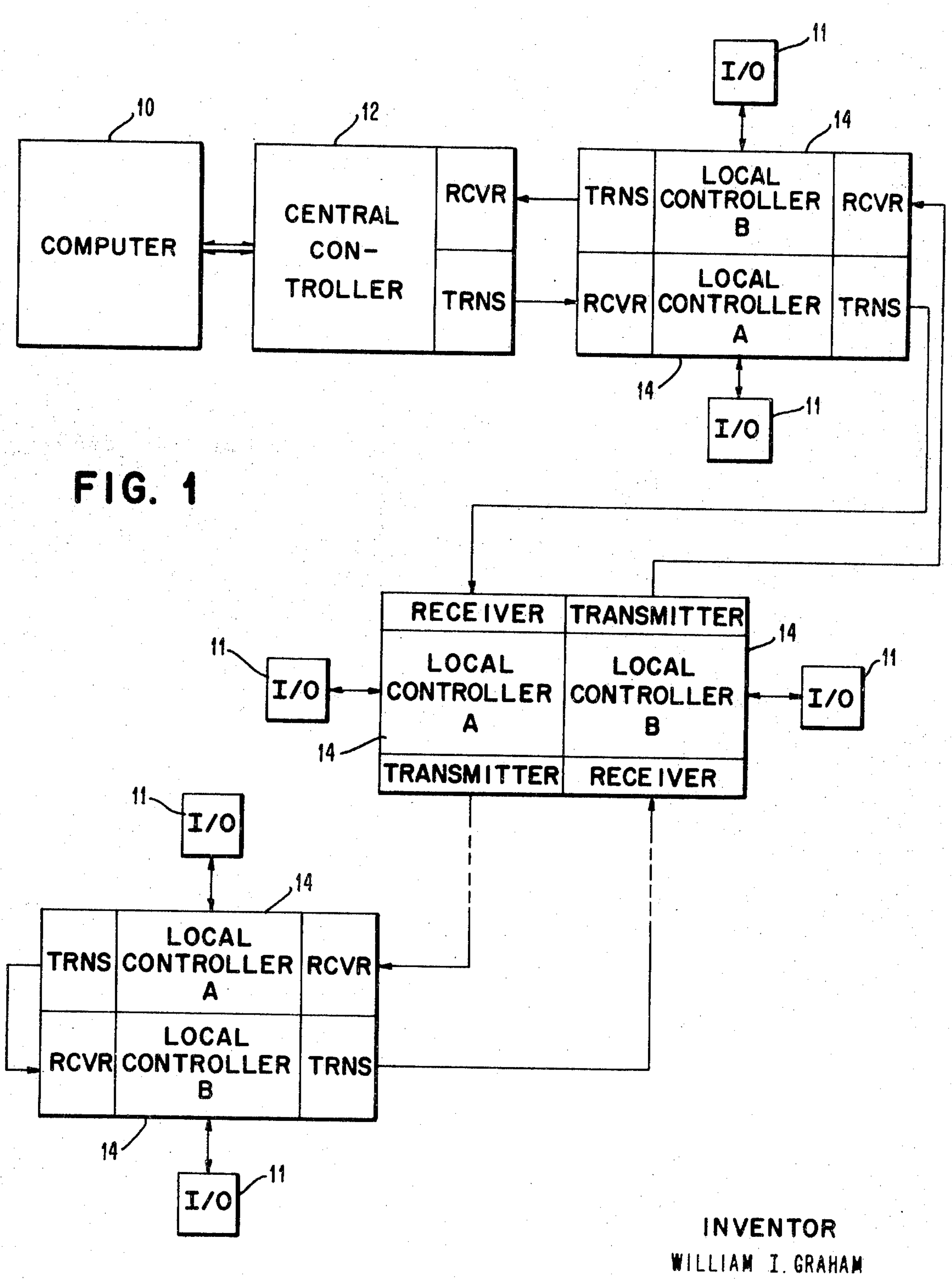
FIGS. 1 and 1A are block diagrams of distribution networks using the novel communications systems operated in accordance with the novel communications method disclosed herein.

A computer 10 communicates with a plurality of remote input-output devices 11 via a central controller 12 and a plurality of local control units 14. The computer 10 is connected via a standard computer interface to the central control unit 12. The central control unit 12 includes a transmitter section and a receiver section. The transmitter section is connected to the receiver of the first local controller 14 which examines the data and effects interconnection between the central controller transmitter and the I/O device connected thereto if data on the line is addressed to the connected input-output device 11. If the data on the line is not addressed to the connected input-output device 11, it is transmitted via a transmitter section to the receiver of the next subsequent local control unit 14 on the line. In this way the local controllers are connected from transmitter to receiver and from transmitter to receiver to the next one to form a loop which returns to the receiver at the central controller 12. The local controllers in the loop have been paired together since they may be operated in this fashion. However, it is unnecessary for these local controllers to be paired and they may be separated by a substantial distance, however, pairing of local controllers enhances diagnostic techniques as will be described in greater detail later.

When an input-output device 11 wishes to communicate with the computer, it searches for an assigned location in the stream of data flowing through the local controller and when this assigned location is indicated by the local controller, data from the input-output 11 is inserted on the line and traverses through the subsequent local controllers back to the receiver at the central control unit 12. More than one input-output device may be connected to a local controller if conventional priority techniques are employed provided only one input-output device is permitted to operate at any one given time and the addressing technique utilized in the system identifies the particular input-output device which is to be connected to the transmission media. A single input-output device has been illustrated since the techniques of multiple connection are well known in the art.

The loop illustrated in FIG. 1 provides a half duplex mode of operation and utilizes a single transmission medium from the transmitter in the central controller 12 back to the receiver of the central controller 12. Data transmission through the loop is always in the direction indicated by the arrows in the drawing and is in the counterclockwise direction. Thus, if an I/O device 11 connected to the very first local controller 14 wishes to communicate with the computer, the data transmitted by the input-output device 11 must traverse each and every local controller connected in the loop in the counterclockwise direction until it is received by the receiver of the central controller 12 which passes the data on to the computer 10.

Figure 1A:
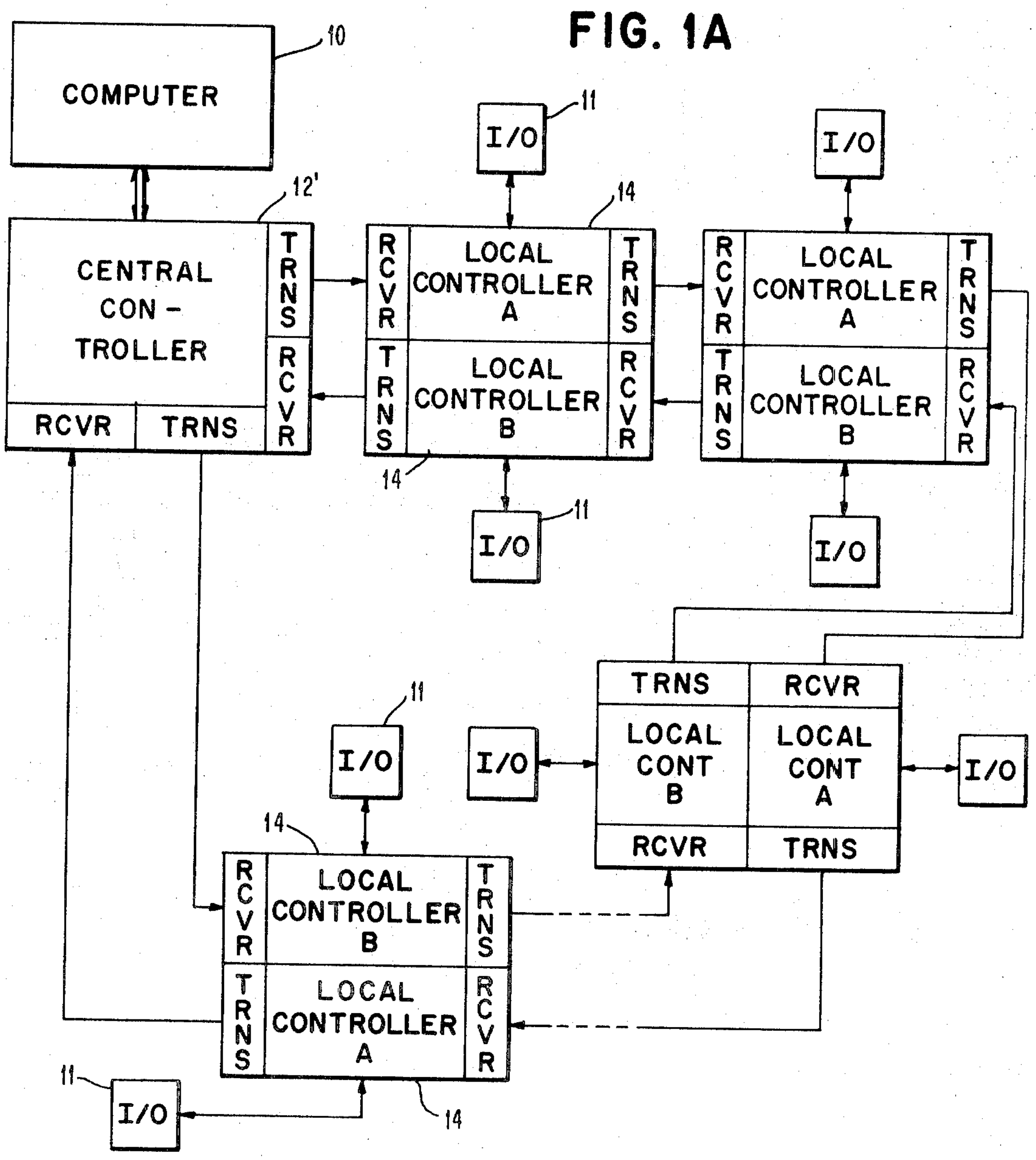

The distribution arrangement shown in FIG. 1A provides full duplex operation of the central controller 12' shown in FIG. 1A. Here two concentric loops are provided in which the data flow is in opposite directions. Thus on the A loop, data flow is in the clockwise direction while on the B loop data flow is in the counterclockwise direction. The choice of one system over another will depend on the amount of traffic which each is required to handle, the number of terminals and the physical layout of the system and includes, in addition, a balance of cost of transmission lines.

Figure 2:
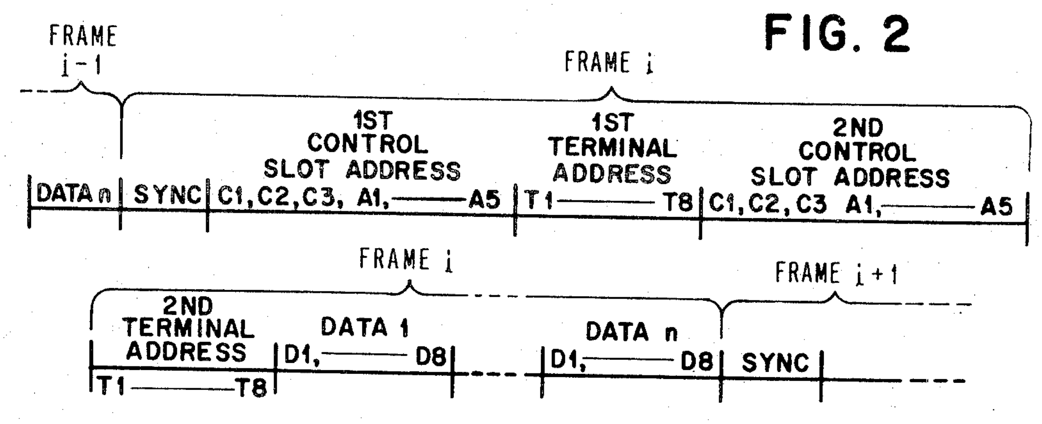
FIG. 2 is a diagrammatic illustration of the data and control distribution in accordance with the invention.

FIG. 2 graphically illustrates data management and line control according to the invention. A plurality of time slots is established. Each of the time slots is capable of accommodating a number of bits. The plurality of time slots is arranged in frames. A single frame $i$ and adjacent slots of frames $i-1$ and $i+1$ are illustrated. The first time slot in each frame contains a unique code which is utilized for synchronizing all devices on the line. The second time slot in each frame includes control data and addressing data. Three bits of control are provided. These are labeled C1, C2 and C3. The positions C1, C2 and C3 identify the function which may be instituted in the particular frame $i$. If it is desired to permit a terminal connected to the external loop via its local controller to begin transmission, position C1 will contain a one and positions C2 and C3 will be zero. Positions A1 through A5 within slot 1 will contain the address of one of the following slots within which that terminal may communicate with the central controller 12 and the computer 10. This address will be accepted by the terminal and that particular slot designated by the address contained in positions A1 through A5 will be utilized by that terminal until the terminal completes transmitting the data it is required to transmit.

When it receives the sync code and decodes this code, it will look at positions C1, C2 and C3 to determine the codes in these positions. If C1 is one, it will accept the address contained in positions A1 through A5 and utilize this address for communicating with the computer via the central controller 12. In order to prevent another terminal further down the line from utilizing this same address and overwriting data which it has inserted in the slot designated by the address, it is necessary that the terminal change the one code received in the C1 position to a zero. Thus, under these conditions, since no other terminals will accept this address, the change of C1 from one to zero will indicate to the central controller and therefore the computer that the slot address in positions A1 through A5 has been accepted. The third slot is transmitted with no data in it and permits the terminal accepting the previous slot address to insert its address which is a unique address for identifying that terminal sending data in the designated slot to the computer. An additional set of controls and terminal address slots are provided. These occupy slots 4 and 5 and function precisely as the previous two slots described.

Position C2 in slots 2 and 4 will designate a writing operation and will contain a one while positions C1 and C3 are zero. When a writing operation is conducted, the third and fifth slots as the case may be will contain the address of the terminal which is to accept the data located in the slot designated by the address in positions A1 through A5 in either slots 2 or 4. The addressed terminal will accept this address and store it and continue to accept data within the designated slot until notified by an end of message code transmitted in that slot that the transmission of data to the terminal has been completed at which time it will no longer accept data in that slot unless it is addressed again. The remaining slots are provided with eight bit positions in the disclosed embodiment. These are the slots identified by the address positions A1 through A5 in slots 2 and 4. In the writing operation designated by a 1 in position C2 of slots 2 and 4, data for the designated terminal is inserted in the slot so designated. The remainder of the data is not addressed since the terminals store the address and continue to receive data in the assigned slot until the operation is terminated by the computer. Likewise during a reading operation, the slot addressed is accepted in the first instance and thereafter the terminal continues to utilize that slot and the computer will reserve the slot for the terminal until the computer receives an end of message signal from the terminal indicating that the message for the computer has been completed and the slot may be reassigned to some other terminal on the loop. The C3 position in slots 2 and 4 is utilized for diagnostic purposes. When a diagnostic routine is to be started at a particular terminal location, positions C1 and C2 will be zero and position C3 will have a one. The particular slot assigned for conducting the diagnostic routines will be designated in the address positions A1 through A5 and the terminal which is to execute the instructions or the diagnostic routine will be designated in the terminal address portion in either slots 3 or 5 as the case may be.

With the arrangement illustrated and described above, a particular slot for either reading, writing or diagnostics is assigned to a terminal in a single frame, thereafter, the terminal utilizes the slot so assigned for either receiving or sending data as the case may be. This technique of dynamic allocation reduces by a substantial amount the control signals utilized for line management since the control signals are only addressed to the terminal or the central once for each operation. Thereafter the slot is reserved for communication with that particular terminal. However, as soon as the terminal completes an operation, the slot is freed for use by another terminal; thus providing maximum utilization of the communications media.

Figure 3:
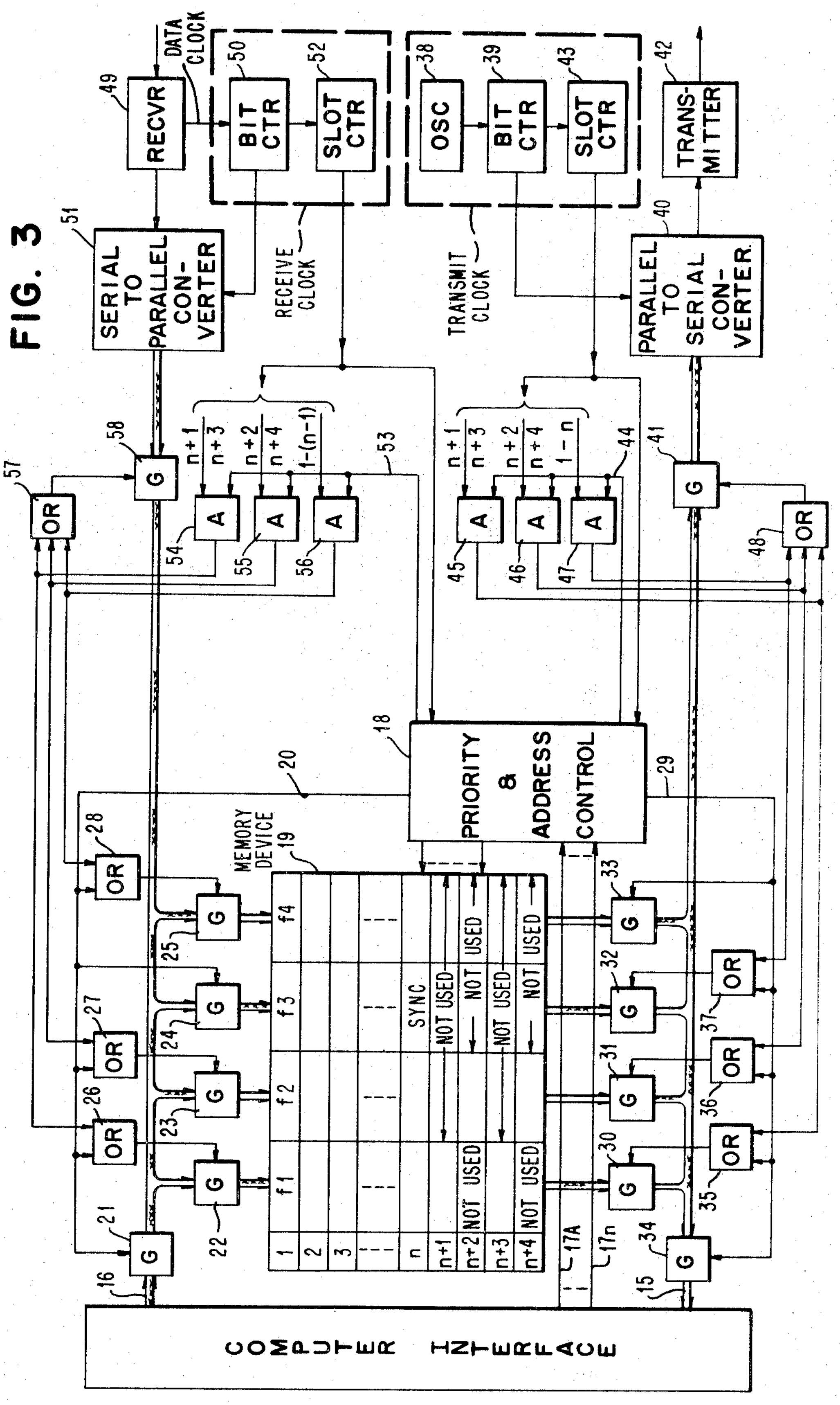
FIG. 3 is a schematic diagram of the central control unit shown in FIG. 1.

The control unit illustrated in FIG. 3 is suitable for direct substitution for control unit 12 shown in FIG. 1. If a full duplex system such as illustrated in FIG. 1A is utilized, the control unit shown in FIG. 3 will have to be duplicated for substitution for control unit 12' since the duplex system shown in FIG. 1A requires a duplication of the control units. The computer will provide switching signals so that data sent for one loop will be identified and data for the other loop will be identified. How this will be accomplished will become apparent as the description continues. The computer interface is provided with a parallel input data bus 15 and a parallel output data bus 16. In addition, the computer interface provides control lines 17A through 17$n$. Control lines 17A through $n$ are connected to a priority and address control circuit 18 which controls a memory device 19 having $n+4$ unique addresses.

Memory 19 receives and sends data to the computer via the computer input and output data buses under control of the signals on lines 17A through $n$. In addition, memory 19 receives data from the receiver section of the control unit in a manner which will be described later and sends data from the memory to the transmitter of the control unit in a manner which will also be described later. The priority portion of circuit 18 may be simple and straightforward and need only assign fixed priorities to the computer, the receiver and the transmitter in any fashion in order to prevent two devices from attempting to operate the memory simultaneously. The address control portion of circuit 18 may be conventional in all respects and will be determined by the type of memory chosen for memory 19.

As previously described, memory 19 contains $n+4$ unique addresses. Each address contains four fields having storage capability of eight bits in each field. The first field is utilized in selected addresses for storing positions C1, C2 and C3 and slot positions A1 through A5 previously described. The second field is utilized for storing the terminal address associated with each of the unique addresses in memory 19. The third field is only utilized in the writing mode for storing data which is to be transmitted to a particular terminal identified in the address portion of field 2. The fourth field is used for storing data in the read mode and the data is supplied by the terminal via the receiver.

The computer may alter all four fields and read all four fields at any time. The transmitter section of the control unit can only transmit fields 1. 2 and 3. In addresses 1 through $n$, only field 3 can be transmitted, in address $n+1$ only field 1, in address $n+2$ only field 2, in address $n+3$ only field 1 and in address $n+4$ only field 2. The receiver portion can record data only in fields 1, 2 and 4. It can only record data in field 4 in addresses 1 through $n-1$. In address $n$, no recording is provided, in address $n+1$—field 1, address $n+2$—field 2, address $n+3$—field 1 and address $n+4$—field 2. The gating for performing the above functions will be described below.

Priority and address control circuit 18 provide a control gating signal on a line 20 which controls the entry of data from the output data bus 16 into memory 19. The data on output data bus 16 is applied via a gate 21 and four additional gates 22 through 25 to the input section of memory 19. The gating signal supplied on line 20 is directly connected to gates 21 and 24 and via OR-circuits 26, 27 and 28 to gates 22, 23 and 25 respectively.

Priority and address control circuit 18 provides an output on a line 29 which is used for transferring data from memory 19 to the input data bus 15. The data traverses a plurality of data gates 30 through 34. Line 29 is directly connected to control gates 34 and 33. It is connected via OR-circuits 35, 36 and 37 to gates 30, 31 and 32 respectively.

A free-running oscillator 38 is connected to a bit counter 39 which operates a parallel to serial converter circuit 40 to convert parallel data supplied via a gate 41 from the memory 19 via gates 30 through 33 inclusive. Serial data from parallel to serial converter 40 is applied to a transmitter 42 which is connected to the external loop previously described. Bit counter 39 is also connected to a slot counter 43 which provides unique outputs identifying the various slots 1 through $n$, $n$+1, $n$+2, $n$+3 and $n$+4. The output of slot counter 43 is applied to priority and address control circuit 18 to provide the request for service as specific addresses designated by the contents of the slot counter 43 require transmission. In response, priority and address control circuit 18 provide an output on a line 44 indicating the availability of service for the transmitter section of the control unit. Line 44 is connected to AND-gates 45, 46, 47 and enables these gates when the transmitter section is to receive service from the memory 19. Outputs $n$+1 and $n$+3 are both applied to the other input of AND-circuit 45 which when previously enabled by the output on line 44 from priority and address control circuit 18 causes the contents appearing in field 1 of memory 19 to be applied via gates 30 and 41 to the parallel to serial converter circuit 40. Outputs $n$+2 and $n$+4 of the slot counter 43 are applied to the other input of AND-gate 46 and cause the contents of the second field of the memory 19 to be applied via gates 31 and 41 to the parallel to serial converter 40. Outputs 1 through $n$ from slot counter 43 are applied to the other input of AND-gate 47 and cause the contents of field 3 of memory 19 to be applied via gates 32 and 41 to parallel to serial converter 40. Gates 30, 31 and 32 are enabled by AND gates 45, 46 and 47 via OR-circuits 35, 36 and 37 respectively.

The outputs of AND-circuits 45, 46 and 47 are applied to an OR circuit 48 which is connected to the control input of data gate 41 and controls operation of that gate to permit passage of the signals from gates 30 through 32 when any of the gates 45, 46 or 47 are active as described above. Thus, during slot counts 1 through $n$, the contents of the memory in field 3 are transmitted via gates 32 and 41 to parallel to serial converter 40 and thus to the transmitter 42 and then on to the line. During slot counts $n$+1 and $n$+3, the contents of field 1 of memory 19 are transmitted via gates 30 and 41 in a similar manner and during slot times $n$+2 and $n$+4, the contents of field 2 of memory 19 are transmitted via gates 31 and 41 in the same manner.

Data from the loop is applied to a receiver 49 which provides a data clock signal to a bit counter 50. The output of the bit counter is applied to a serial to parallel converter circuit 51 which receives the serial data from the receiver and converts it to parallel form under the control of the output of bit counter 50. The output from bit counter 50 is also applied to a slot counter 52 which provides the slot counts 1 through $n$, $n$+1, $n$+2, $n$+3 and $n$+4. The slot counter output is applied to priority and address control circuit 18 which provides an output on a line 53 indicating that data may be inserted from the serial to parallel converter circuit 51 into memory 19. Output 53 is connected to AND-circuits 54, 55 and 56 and enables these circuits when a data input operation is to be permitted.

Figure 4:
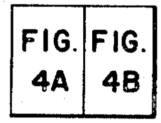
FIGS. 4 and 4A and 4B are schematic diagrams of the local control unit shown in FIG. 1.
Figure 4A:
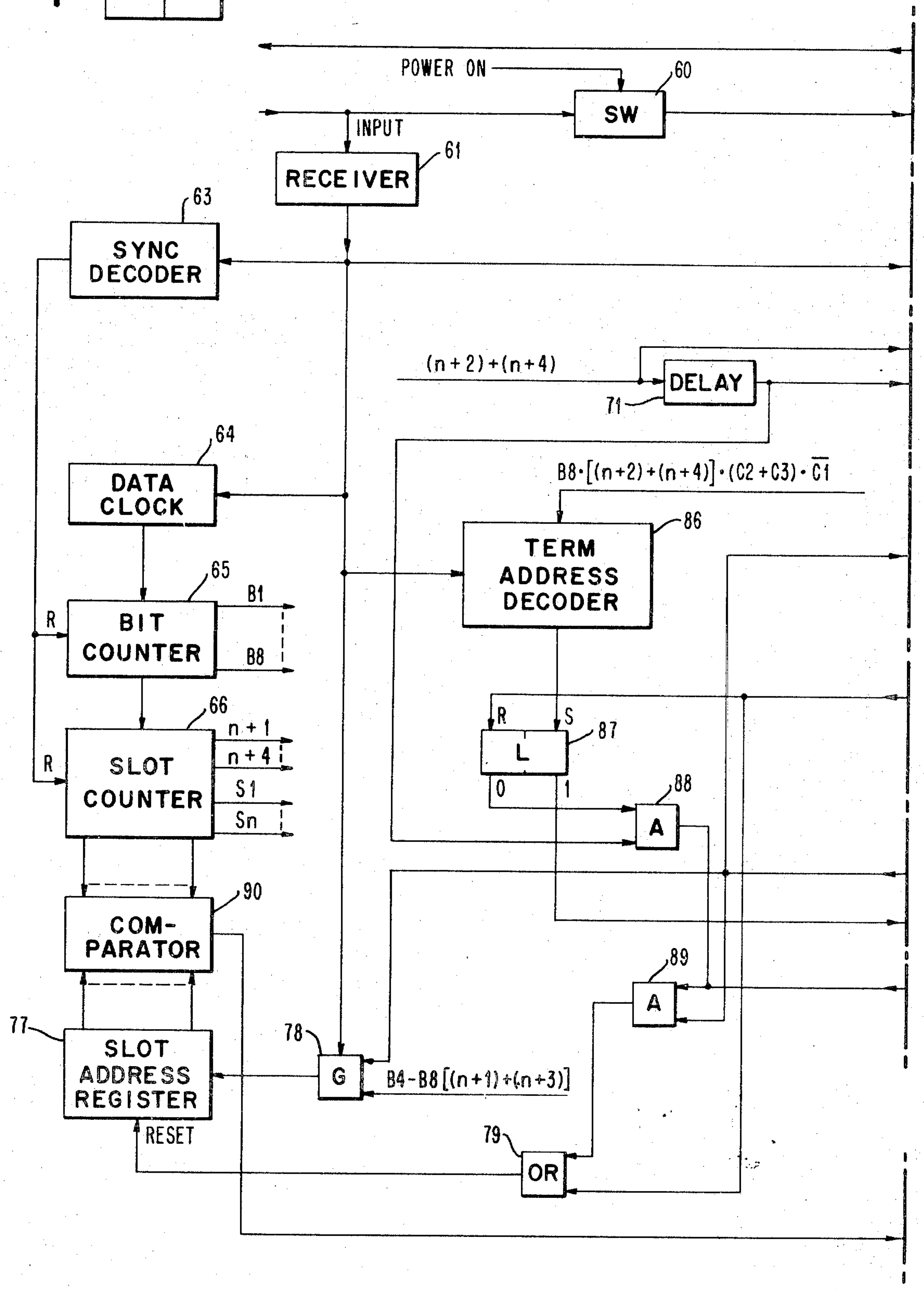
Figure 4B:
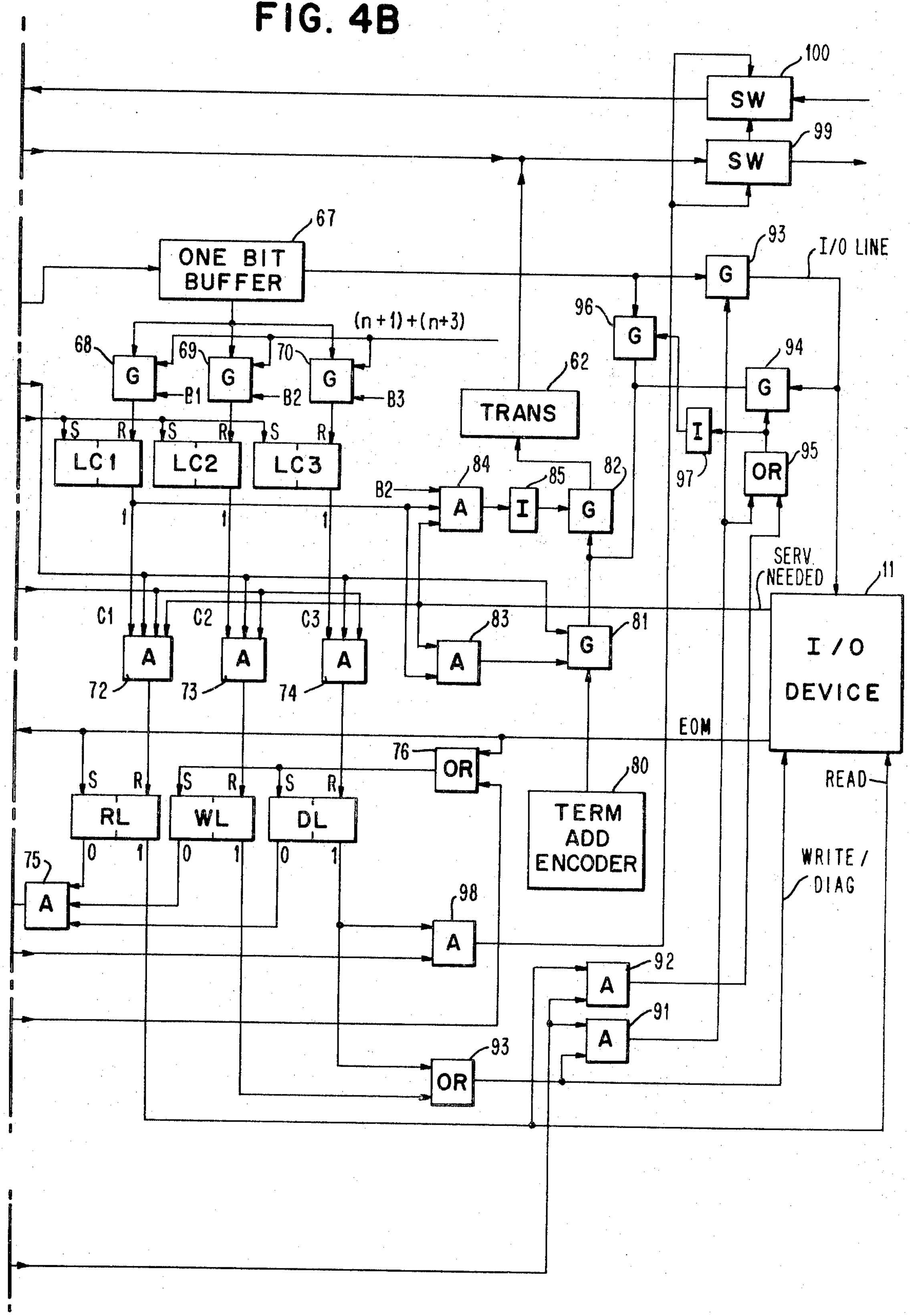

Outputs 1 through $n$−1 from slot counter 52 are applied to the other input of AND-circuit 56. The output of AND-circuit 56 via OR-circuit 28 enables gate 25 to cause the data contained in serial to parallel converter 51 to be inserted via gate 25 into field 4 of addresses 1 through $n$−1 of memory 19. Output $n$+1 and $n$+3 from slot counter 52 are applied to the other input of AND-gate 54. The output of AND-gate 54 via OR-circuit 26 causes the contents of serial to parallel converter 51 to be inserted into field 1 of addresses $n$+1 and $n$+3. Outputs $n$+2 and $n$+4 are applied to the other input of AND-gate 55, the output of which via OR-circuit 27 causes the contents of serial to parallel converter 51 to be inserted into field 2 of addresses $n$+2 and $n$+ 4. The outputs of gates 54, 55 and 56 are connected via an OR-circuit 57 to a gate 58 which controls the transfer of data from serial to parallel converter 51 to gates 22, 23 and 25. FIG. 4 is a detailed block diagram of a local controller 14 for connecting an I/O device 11 to the transmission line and thus to the central controller 12. A bypass switch 60 short circuits, in its normal condition, the receiver 61 input and the transmitter 62 output. When power at the local controller is turned on, the switch 60 is opened thus isolating the input of receiver 61 from the output of transmitter 62.

The output of receiver 61 is applied to a sync code decoder circuit 63 and a data clock circuit 64. Sync code decoder circuit 63 provides an output whenever the sync code contained in slot $n$ is received, data clock circuit 64 provides a pulse with each data bit. The output from the data clock 64 is applied to a bit counter circuit 65 which is provided with eight positions in the disclosed embodiment for the eight bits per slot. The eighth position of bit counter 65 is applied to a slot counter circuit 66. The slot counter 66 is provided with a unique count for each of the $n$ slots in addition to $n$+1 through $n$+4. The output of sync decoder circuit 63 is applied to the reset input of bit counter 65 and the reset input of slot counter 66. The output of receiver 61 is also applied to the input of a one-bit buffer 67 which stores the successive bits in the bit stream for one bit time.

The one bit in buffer 67 is applied simultaneously to three gates 68, 69 and 70. Gates 68, 69 and 70 are enabled by the outputs $n$+1 and $n$+3 from slot counter 66, thus, if either $n$+1 or $n$+3 is active, one of the enabling inputs of gates 68, 69 or 70 is active. The other enabling input of gate 68 is connected to the B1 output of bit counter 65. The other input of gate 69 is connected to the B2 output of bit counter 65 and the other input of gate 70 is connected to the B3 output of bit counter 65. The output of gate 68 is connected to the set input of a latch LC1. The output of gate 69 is connected to the set input of a latch LC2 and the output of gate 70 is connected to the set input of a latch LC3. This arrangement will register in latches LC1, LC2 or LC3. A one in data positions C1, C2 or C3 of the slots $n$+1 or $n$+3 to indicate a reading operation, a writing operation, or a diagnostic operation. The latches LC1, LC2 and LC3 are reset by the $n$+2 or $n$+4 outputs of slot counter 66 which have been delayed in a delay circuit 71. The delay provided by circuit 71 assures that a reset will not occur until after the $n$+2 or $n$+4 slots have been processed. The one output of latches LC1, LC2 and LC3 is connected to one of the inputs of AND-circuits 72, 73 and 74, respectively. The outputs of AND-circuits 72, 73 and 74 are connected to the set inputs of latches RL, WL and DL, respectively. The zero outputs of latches RL, WL and DL are connected to an AND-gate 75 which has its output connected to AND-gates 72, 73 and 74. Thus, AND-gates 72, 73 and 74 will be disabled if either latches RL, WL or DL are in the set condition.

AND-gates 72, 73 and 74 are also enabled by the $n$+2 or $n$+4 outputs from slot counter 66. In addition, AND gate 72 requires a service needed signal from the input-output device 11. Thus, if latches RL, WL and DL are all zero, if latch LC1 is set and during the $n$+2 or $n$+4 time period of slot counter 66 and a service needed request from input-output device 11, all exist simultaneously, latch RL will be set. This will indicate a read operation during which period of time data from the I/O device 11 will be sent to the central station and on to the computer. As soon as latch RL is set, AND-gate 75 is disabled disabling AND-gate 72, 73 and 74 to prevent entrance into another mode of operation such as a write mode or a diagnostic mode. The interlocking arrangement just described assures that once an operation is started, another operation of a different character will not be commenced until the operation has been completed. When an operation has been completed, the input-output device 11 provides an end of message signal on its own in the case of a reading operation. The central provides an end-of-message signal in the case of a writing or diagnostic operation. This end-of-message signal is applied to the reset input of latch RL and resets that latch from the one condition to the zero condition. It is applied to the reset inputs of latches WL and DL via an OR-circuit 76 and will reset those latches. Latches WL and DL will be reset by another signal which will be described later.

The output of receiver 61 is, in addition, connected to a slot address register 77 via a gate 78. The gate 78 will only be enabled during slot periods $n+1$ or $n+3$ and in both instances only during bit times four through eight. In addition, the output of AND-circuit 75 is also required to enable this gate. Thus, if the local controller is not busy, that is latches RL, WL and DL are also reset and during slots $n+1$ and $n+3$ and bit times four through eight, the slot address received via receiver 61 will be inserted in the slot address register 77. The output of AND-gate 75 assures the integrity of the slot address on subsequent frames if the terminal has already registered a slot address and a new slot address will not be overwritten on the slot address contained in register 77. The end of message reset from the I/O device 11 is applied via an OR-circuit 79 to the reset input of the slot address register 77 to reset this address register when an operation has been completed. The slot address register will also be reset under another set of conditions which will be defined later.

A terminal address encoder 80 provides the unique address code for the local controller. Each local controller address encoder 80 will provide a different code. The computer will be able to identify the local controller transmitting this code on to the line. The terminal address encoder is connected to a transmitter 62 by a pair of gates 81 and 82. The one output of latch LC1 and service needed from I/O device 11 are applied to an AND-circuit 83 which is one of two enabling inputs for gate 81. The other enabling input of the gate 81 is the $n+2$ or $n+4$ outputs of slot counter 66. Thus, only during slots $n+2$ or $n+4$ and with latch LC1 set to the one condition and service needed will the terminal address encoder 80 be connected to the transmitter 62. Gate 82 will be opened at all times during the bit time following C1 and AND-gate 84 has one input connected to the one output of latch LC1, a second input connected to service needed and a third input connected to B2 output of bit counter 65. The output of this gate is inverted by a circuit 85 and connected to the enabling input of gate 80. This circuit permits changing the one in the C1 position of slots $n+1$ and $n+3$ from a one to a zero if the slot address contained in those slots is accepted by the local controller for use in subsequent frames.

The output of receiver 61 is also connected to a terminal address decoder circuit 86 which attempts to decode the address of the terminal if present at the output of receiver 61. The decoding process is under control of the bit counter 65, the slot counter 66 and latches LC1, LC2 and LC3. During bit eight (B8) time of slots $n+2$ or $n+4$ with either C2 or C3 and $\overline{C1}$, the address will be decoded if it has been received during the previous eight bit times. If terminal address decoder 86 detects the address during the previous eight bit times, a latch 87 will be set. With latch 87 set, the terminal has been selected by the computer by either having a one in the C2 or C3 positions and the terminal address in slots $n+2$ or $n+4$. It is necessary to store the slot address which appears either in the $n+1$ slot or the $n+4$ slot before determining whether or not the terminal address is present. Thus, if the terminal address is not decoded in the $n+1$ or $n+4$ slots, latch 87 will remain reset. The zero output of latch 87 is applied to an AND-gate 88 along with the output of delay circuit 71. If the address has not been decoded during the above stated time, the output of AND gate 88 is applied to one input of another AND gate 89 along with the output of AND-gate 75 and via OR-circuit 79 used to reset slot address register 77. This step is necessary to reset the slot address register if the particular local controller has nob been selected by the address contained in slots $n+2$ or $n+4$.

A comparator circuit 90 is responsive to the contents of slot counter 66 and slot address register 77 and provides an output whenever the two agree. The output of comparator 90 is applied to a pair of AND-gates 91 and 92. The other input of AND-gate 91 is derived from the one output of latches WL and DL via an OR-circuit 93. The other input of AND-gate 92 is derived from the one output of latch RL. The output of OR-circuit 93 and the output of latch RL1 are applied directly to the I/O device 11 in addition to AND-gates 91 and 92 to indicate in the case of the output of OR circuit 93 that a write or diagnostic operation is in process and in the case of latch RL that a read operation is in process.

The input-output line of I/O device 11 is connected to a gate 93 and a gate 94. Gate 93 connects the one-bit buffer 67 to the line and is under control of the output of AND circuit 91. Gate 94 connects the input-output bus of I/O device 11 to the input of gate 82 and is under the control of both the outputs of AND-circuits 91 and 92 via an OR circuit 95. If a write or diagnostic operation is in process, data from the one-bit buffer 67 is applied via gate circuit 93 to the input-output line and via gate 94 and 82 back to the transmitter, thus the terminal will reproduce the data appearing on the line and the data will also be retransmitted to the central controller and the computer to indicate completion of transit through the loop. If a reading operation is in process, data from the line is transmitted via gate 94 and gate 82 to the transmitter. In this mode, gate 93 is closed and any data in one-bit buffer 67 is not retransmitted since the I/O device 11 is supplying the data to the transmitter 62. An alternative path from one-bit buffer 67 to the transmitter 62 is provided via a gate circuit 96 and gate 82. Gate 96 is under the control of the output of OR-circuit 95 via an inverter circuit 97. Thus, under all other conditions and those previously defined for the transfer of data, data from one-bit buffer 67 is passed through gate 96 and gate 82 to the transmitter 62 and passed on to the loop.

The one output of latch 87 is applied to one input of an AND-gate 98. The other input of AND-gate 98 is connected to the one output of latch DL. Thus, in the diagnostic mode and with the terminal address decoded, the output of AND-circuit 98 is utilized for operating a pair of line switches 99 and 100. Switches 99 and 100 short circuit the loop returning the data from the terminal 11 directly back to the central. This mode of operation may be used for diagnosing line faults. Other uses may be found for the output of AND-circuit 98 in addition to the one shown. The end of message signal received from the central station will reset latch 87 restoring it to its reset position.

When I/O device 11 desires service, the service needed line from the I/O device is activated. This is applied to AND-circuit 72 and AND-circuit 84 as well as AND-circuit 83. If a C1 bit in either the $n+1$ or the $n+3$ slot is received, this will be registered in latch LC1. As soon as latch LC1 is set, AND-circuit 84 via inverter 85 causes the one bit to be changed to a zero bit during retransmission. This prevents another local controller further down the loop from securing the slot available in the current frame. The service needed signal will not be generated by the I/O device 11 if the local controller is otherwise occupied since both the write and diagnostic signals are applied to the I/O device 11. Latches RL, WL and DL therefore have been previously reset to the zero condition and gate 78 is enabled during bit times four through eight of the particular slot $n+1$ or $n+3$. The slot address is gated into the slot address register 77 and this slot address will be retained until communications via that slot have been completed. At $n+2$ or $n+4$ slot, as the case may be, the latch RL will be set via AND circuit 72 since this circuit will now be completely enabled and the I/O device 11 will be informed that a read operation is now in process and service needed will go down.

When the value of slot counter 66 equals the slot address register value, comparator 90 will provide an output which will pass through gate 92 which has been enabled by the one output of latch RL. This will operate gate 94 permitting data within the I/O device 11 to be inserted in the slot via gate 82 and transmitter 62. Each time the slot counter 66 equals the slot address register, comparator 90 will provide this same signal and data may be inserted by I/O device 11 into the assigned slot. When I/O device 11 has completed transmitting data, it generates an end of message signal which is utilized to reset latch RL. This same end of message is also utilized to reset the slot address register and at this time AND-gate 75 provides an output which indicates that the device is now available.

A write or diagnostic operation is substantially similar. However, the terminal address decoder 86 is utilized in this instance to detect if the terminal is being addressed. Latches WL or DL will be set at $n+2$ or $n+4$ times. However, if latch 87 is not set or remains reset by virtue of the fact that the address is not decoded by $n+2$ or $n+4$ slot times delayed, both latches WL and DL as the case may be will be reset via AND-gate 88 and OR-circuit 76. If, however, the address has been detected, latch WL or DL as the case may be will remain set until the central indicates a termination of the transaction by providing an EOM to the I/O device 11. When the I/O device 11 detects an EOM transmitted by the central, it terminates the particular mode of operation in the same way as previously described for the read mode.

While the invention has been particularly shown and described with reference to a preferred embodiment thereof, it will be understood by those skilled in the art that various changes in form and details may be made therein without departing from the spirit and scope of the invention.

What is claimed is:

1. A method for bidirectionally communicating coded data between a central station and a plurality of serially looped local stations comprising the steps of:
   - providing a fixed number of time-separated contiguous time slots in which the number of slots provided is much greater than one and substantially less than the maximum number of local stations;
   - providing a header section for each fixed number of time-separated contiguous time slots which includes;
     - a first group of uniquely coded bits for identifying the beginning of the fixed number of time-separated contiguous time slots and for permitting the local stations to synchronize their operation therewith,
     - a second group of control bits including a first part for designating one of several communications functions which are initiated in at least one but substantially less than all of the fixed number of time slots and a second part for identifying the time slot within which the initiated function will take place, and
     - a third group of address bits for identifying at least one local station which is to initiate the function.

2. A method for transmitting data from a plurality of remotely located stations to a central station in which the remote stations are connected in a serial loop with the central station comprising the steps of:
   - providing a fixed number of time-separated contiguous time slots within which data is transmitted on the station interconnecting line and in which the number of slots provided is substantially greater than one and substantially less than the maximum number of remote stations;
   - providing a header section for each fixed number of time-separated contiguous time slots which includes;
     - a first group of uniquely coded bits for identifying the beginning of the fixed number of time-separated contiguous time slots and for permitting the remote station to synchronize operation therewith,
     - a section group of control bits including a first part for indicating the availability of at least one time slot and a second part for identifying the available time slot,
     - a third group of bits for identifying at least one local station which requires service,
   - for each remote station requiring transmission service changing the first part of the second group of control bits to a nonavailable condition, registering the second part of the second group of control bits to provide access to the available slot, and
   - inserting the address of the remote station requiring service in the third group of bits to indicate to the central station the remote station communicating in the available channel.

3. A method for transmitting data from a central station to a plurality of remote stations in which the remote stations are connected in a serial loop with the central station comprising the steps of:
   - providing a fixed number of time-separated contiguous time slots within which data is transmitted by the central on the station interconnecting lines to the remote station and in which the number of slots provided is substantially greater than one and substantially less than the maximum number or remote stations;
   - providing a header section for each fixed number of time-separated contiguous slots which includes;
     - a first group of uniquely coded bits for identifying the beginning of the fixed number of time-separated contiguous time slots and for permitting the remote stations to synchronize operation therewith,
     - a second group of control bits including a first part for indicating that at least one slot but substantially less than the total number of slots is being assigned to a remote station to initiate one of several communications functions and a second part for identifying the assigned slot,
     - a third group of bits for identifying the remote station which is to accept data in the slot identified, and
   - registering the slot address at the addressed remote station to permit access to the assigned slot during the subsequent slot period until transmission is terminated by the central station.

4. A method for bidirectionally transmitting coded data between a central station and a plurality of remote stations in which the remote stations are connected in a serial loop with the central station comprising the steps of:
   - providing a fixed number of time-separated contiguous time slots within which coded data is transmitted on the station interconnecting line between the remote stations and the central station and in which the number of slots provided is substantially greater than one and substantially less than the maximum number of remote stations;
   - providing a header section for each fixed number of time-separated contiguous time slots which includes;
     - a first group of uniquely coded bits for identifying the beginning of the fixed number of time-separated contiguous time slots and for permitting the remote stations to synchronize operation therewith,
     - a second group of control bits including a first part for designating at least one of several communications functions which can be initiated in at least one of the fixed number of time slots and a second part for identifying at least one time slot within which the designated communications function is initiated,
     - a third group of bits for identifying at least one local station which is to initiate a communications function in the identified time slot,
   - at each remote station examining the bit stream to detect the first header group for maintaining slot synchronization with the bit stream; and
   - at each noncommunicating remote station examining the first part of the second group to determine the function initiated in the associated time slots, registering the slot identification, examining the third group of bits if communications from the central to the remote are being initiated and accepting data from the registered time slot if the remote address in the third group corresponds to the remote station address until instructed by data accepted to cease, and if communications from the remote to the central are required, changing the first part of the second group to a neutral state, inserting the remote station address in the third group of bits to identify the transmitting station, and communicating data to the central in the registered time slot until all data has been communicated.

5. A communications system comprising:
   - a central station;
   - a plurality of remote stations;

transmission means interconnecting said central station and said plurality or remote stations in a serial loop for bidirectional data communications in one direction;
means at said central station for repetitively transmitting onto said loop, a header section followed by a fixed number of time-separated contiguous time slots, said header section including;
a first group of uniquely coded bits for identifying the beginning of the fixed number of time-separated contiguous time slots and for enabling slot synchronization at said remote stations,
a second group of control bits for designating one of several functions which are initiated in at least one of the fixed number of time slots, and
a third group of address bits for identifying at least one remote station which is to initiate the designated first function;
first means at each of said remote stations for monitoring the bit stream on the transmission means and for detecting the said first group of bits;
counter means at each station responsive to the first means for establishing a slot count for identifying the slots as they are received;
second means at each station for examining the second group of bits to decode the function initiated;
third means at each station for registering part of the second group of bits in the header when the remote station is not transmitting or receiving data;
first selectively operable means at each station for selectively altering part of the second group of bits and for inserting a unique station address in the third group of address bits when communications between the remote station and the central station are needed;
fourth means responsive to the second means when the function indicated by the second group of bits indicates reception of data from the central station for examining the third group of address bits for decoding a unique remote station address code and for enabling data reception at the remote station; and
fifth means responsive to the counter means and the third means for permitting the station to receive or send data via the transmission loop when the counter means and the third means have a predetermined relationship.

6. A communications system as set forth in claim 5 in which said second group of control bits in the header section includes a first part for designating at least one of several communications functions which is to be initiated and a second part for indicating which of the time slots is to be used for the initiated communications function.

7. A communications system comprising:
a central station;
a plurality of remote stations;
transmission means interconnecting said central station and said plurality of remote stations in a serial loop for transmitting data from said central station to said remote stations;
means at said central station for repetitively transmitting onto said transmission means a header section followed by a fixed number of time-separated contiguous time slots containing data for selected remote stations;
said header section including;
a first group of uniquely coded bits for identifying the beginning of the fixed number of time-separated contiguous time slots for enabling slot synchronization at said remote stations,
a second group of control bits indicating the initiation of transmission of data from the central to a remote station in at least one identified time slot, and
a third group of address bits for identifying at least one remote station which is to receive the data in the identified time slot,
first means at each said remote station for monitoring the bit stream on the transmission means and for detecting the said first group of bits;
counter means at each remote station responsive to the first means for establishing a slot count for identifying the slots as they are received;
second means at each remote station for examining the second group of control bits to detect the initiation of a data transfer from the central to a remote station;
third means at each remote station for registering the slot identification contained in the second group of control bits;
fourth means for examining the third group of address bits for decoding a unique remote station address code and for enabling data reception at the remote station; and
fifth means responsive to the counter means and the third means for accepting data on the transmission loop when the counter means and the third means bear a predetermined relationship to each other and reception is enabled by the said fourth means.

8. A communications system comprising:
a central station;
a plurality of remote stations;
transmission means interconnecting said central station and said plurality of remote stations in a serial loop for transmitting data from said remote stations to said central station;
means at said central station for repetitively transmitting onto said transmission means a header section followed by a fixed number of time-separated contiguous time slots for containing data to be transmitted from the remote stations to the central station;
said header section including;
a group of uniquely coded bits for identifying the beginning of the fixed number of time-separated contiguous time slots and for enabling slot synchronization at said remote stations,
a second group of control bits indicating the initiation of transmission of data from a remote station to the central station in at least one identified time slot, and
a third group of address bits for identifying to the central a remote station initiating data transfer to the central via the slot identified in the second group of control bits,
first means at each of said remote stations for monitoring the bit stream on the transmission means and for detecting the said first group of bits;
counter means at each remote station responsive to the first means for establishing a slot count for identifying the slots as they are received;
second means at each remote station for examining the second group of control bits to detect the initiation of a data transfer from the remote stations to the central station;
third means at each remote station responsive to the second means for altering the second group of control bits when the station has data to transmit to the central so that subsequent remote stations will be inhibited from transmitting in the identified slot and for inserting a unique station address in the third group of address bits;
fourth means at each remote station for registering the slot identification contained in the second group of control bits if the remote station has data to transmit to the central; and
fifth means responsive to the counter means and the fourth means for inserting data to be transmitted from the remote station to the central station into the transmission means when the counter means and the fourth means have a predetermined relationship.

* * * * *

75